(No Model.)  J. E. SHERIDAN.  2 Sheets—Sheet 1.
SCREW PRESS.
No. 457,225.  Patented Aug. 4, 1891.
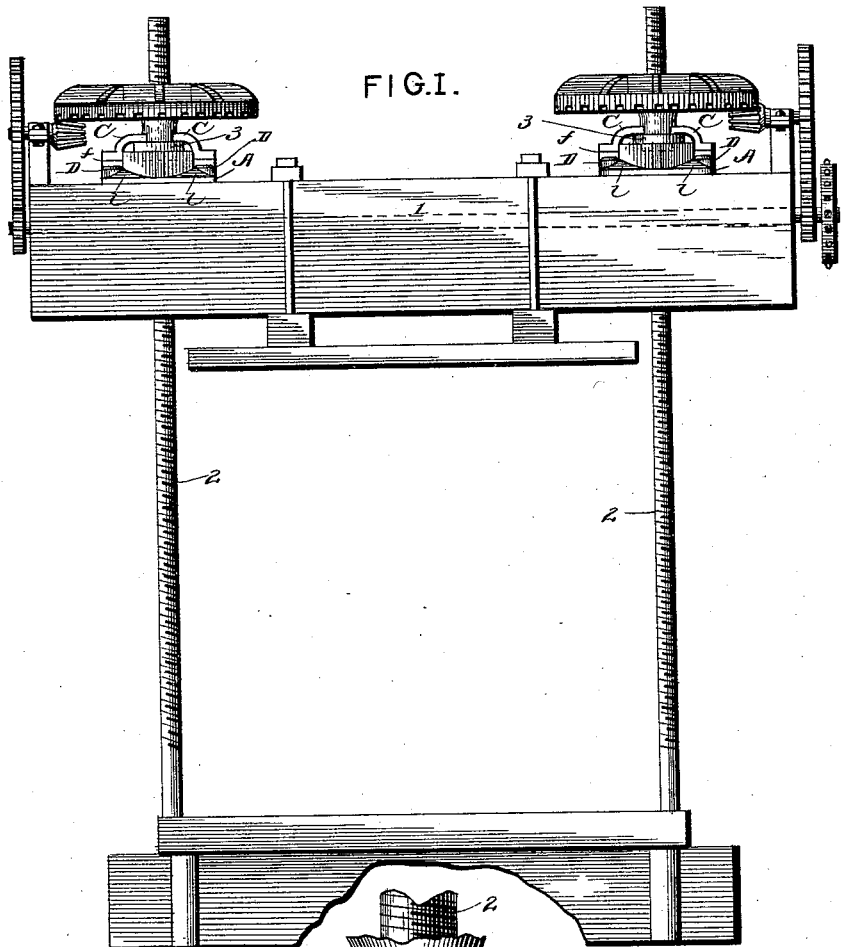
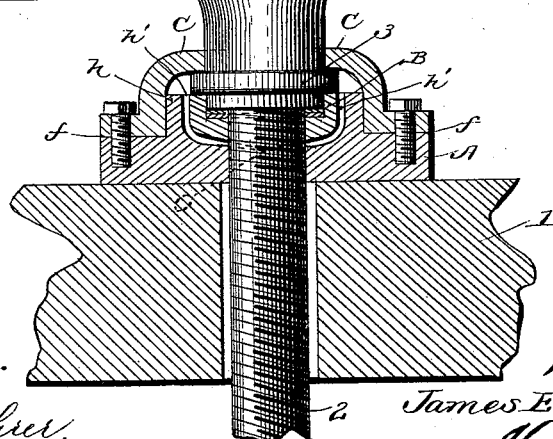
Witnesses:  Inventor:
Harry S. Rohrer.  James E. Sheridan.
Emma Arthur.  By Knight Bros.
  Attorneys.

(No Model.) 2 Sheets—Sheet 2.
J. E. SHERIDAN.
SCREW PRESS.
No. 457,225. Patented Aug. 4, 1891.
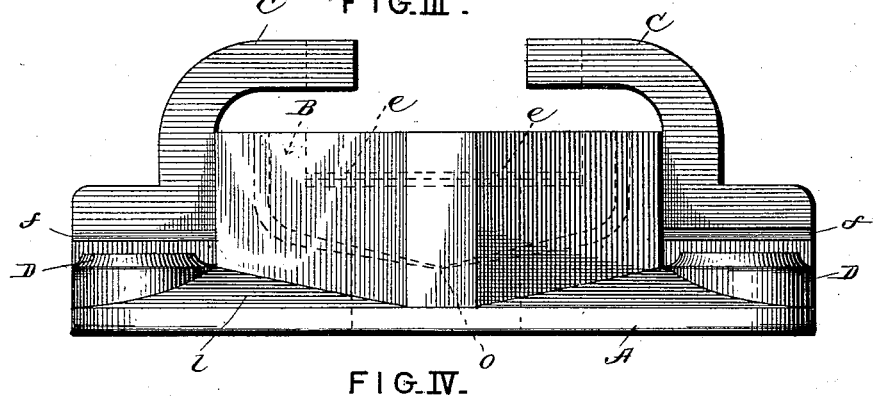
FIG. III.
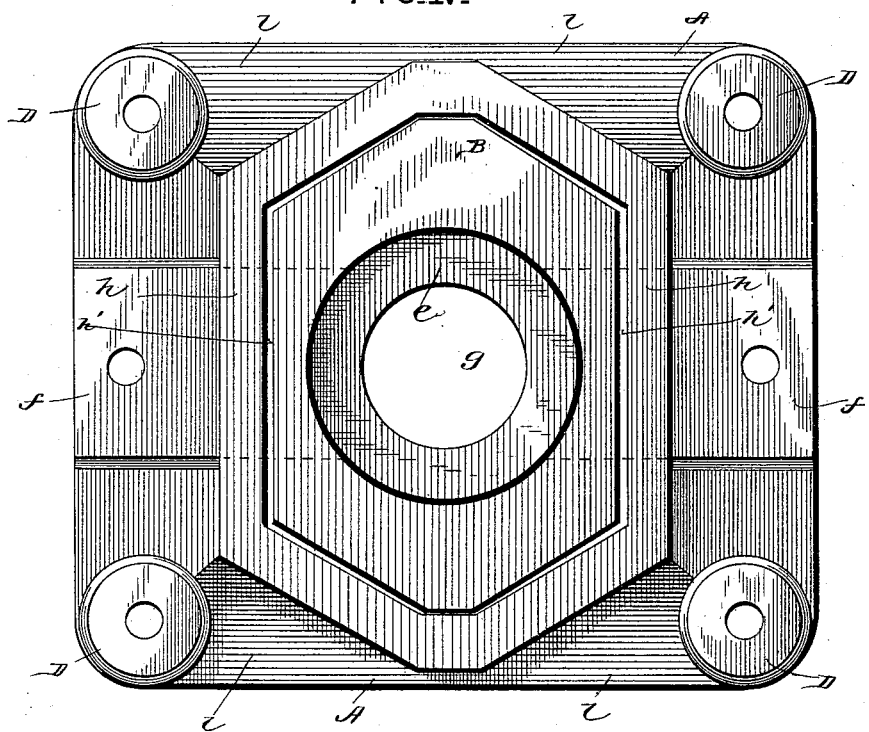
FIG. IV.
Witnesses:
Harry S. Rohrer.
Emma Arthur.
Inventor:
James E. Sheridan,
By. Knight Bros
Attorneys.

UNITED STATES PATENT OFFICE.

JAMES E. SHERIDAN, OF FULTON, NEW YORK.

SCREW-PRESS.

SPECIFICATION forming part of Letters Patent No. 457,225, dated August 4, 1891.

Application filed September 9, 1890. Serial No. 364,419. (No model.)

*To all whom it may concern:*

Be it known that I, JAMES E. SHERIDAN, a citizen of the United States, residing at Fulton, in the county of Oswego and State of New York, have invented a new and useful Improvement in Screw-Presses, of which the following is a specification.

A familiar difficulty exists in the use of screw-presses as usually constructed by the springing of the beam under a load and the consequent deflection of the bearing-surfaces of the nuts upon the beam. To obviate this it has been proposed to interpose between the nuts and their bearings on the beams, instead of common flat washers, concave washers resting on convex bearings, the theory being that this will enable the nuts to adjust themselves into line with the screws, notwithstanding the deflection of the surface of the beam on which they rest. The friction between the parts, however, resists this automatic adjustment and the possible movement is limited in extent. In my invention I dispense with the concave washers above referred to, employing common flat washers, such as are ordinarily used between fixed and rotating surfaces, and as the deflection of the surfaces, due to the springing of the beam, is mainly in a vertical plane coincident with the beam and the screws, I set the said flat washers and the nut which rests on them in a step of novel construction adapted to tip freely in the plane of the beam without changing its bearing upon a straight bearing-ridge, with which it is provided, and thus, without any material resistance from friction, completely compensate for the relative angular movement of the parts caused by the deflection of the beam and afford a direct and solid bearing for the nut without any tendency to cramping.

In order that my invention may be fully understood, I will proceed to describe it in connection with the accompanying drawings, in which—

Figure I is an elevation of a screw-press illustrating my improvement. Fig. II is a vertical longitudinal section of one end of the beam and its attachments on a larger scale. Fig. III is a front view of the rocking step and its accessories detached, also on a larger scale. Fig. IV is a plan of the same.

The entire structure (shown in Figs. III and IV) may be termed a "step" for one of the operating-nuts, which works on the screw and transmits the power to the beam; but speaking more definitely, A constitutes the base or bed, which is fixed to the beam 1, and B the rocking step bearing on the said base or bed.

2 2 represent the press-screws, and 3 the customary nuts working thereon, which may be formed in ordinary gear-wheels or crown-wheels or bevel-gears, according to the construction of the press.

The step B is provided with a horizontal bearing-ridge extending across its bottom from side to side and resting on the base or bed A at $o$ $o$ transversely to the beam and in a plane coincident with the axis of the press-screw, the said step resting in a corresponding seat $h$ so formed as to afford sufficient play at $h'$ $h'$ on each side of the step B to permit it to tip within its bed or base upon the bearing-line $o$ $o$. The bearing being in its nature a knife-edge bearing, a solid support is attained and freedom of rocking permitted without friction. Common flat steel friction-washers $e$ $e$ are placed in the cavity in the upper face of the rocking step B to receive the nut 3.

C C represent hook arms or caps surmounting the nuts and confining them on the steps B for lifting the beam in customary manner. If preferred, the bearing $o$ $o$ may conform to a slightly-raised incline, and thus accomplish the purpose of my invention, while having a slight tendency to center the step. In either case the rocking step B will be seen to adapt itself automatically to the line of the screws, so as to afford a firm, direct, and positive bearing for the press-nuts, even though the beam may be considerably sprung and deflected.

The base or bed A may be of any suitable construction to adapt it for attachment to the beam. I have shown at D D D bosses for bolts to fasten the said base to the beam, and at $l$ $l$ a chamfer to dispense with unnecessary weight of metal.

$f f$ represent seats for the hook arms or caps C C, and $g$ the aperture through which the screw passes.

Having thus described my invention, what I claim as new therein, and desire to secure by Letters Patent, is—

1. In a screw-press, the step B for the screw-nut constructed with a bearing-ridge extending in a straight horizontal line from side to side in the plane of the axis of the screw to permit the tipping of the step lengthwise of the beam without changing its bearing.

2. The combination of the beam 1, the screw 2, the nut 3, the tipping step B, constructed with a straight-edge bearing, and the bed or base A, constructed, substantially as described, with a seat $h$, affording a horizontal bearing for the straight edge of the said tipping step, and a space $h'$ on each side of said step to permit the step to tip without changing its bearing or coming in contact with the sides of the seat, as set forth.

3. The combination of the tipping step B, having the straight bearing-ridge, the base A, having the seat $h$, affording a straight-edge bearing for said step, and spaces on the sides of the bearing-ridge for permitting it to tip, the nut 3, resting on the step, and the hook or cap C, secured to the base and engaging the nut to prevent its displacement, substantially as explained.

4. The combination of the beam 1, the beds or bases A, fixed securely to the opposite ends of the beam, the tipping steps B, having straight-edge bearings in the respective beds or bases, the nuts resting upon the steps, the screws passing through the respective nuts, steps, bases, and beam ends, and suitable driving mechanism for the nuts, substantially as explained.

JAMES E. SHERIDAN.

Witnesses:
E. B. COLLINS,
CHAS. WHITAKER.